United States Patent
Yu

(10) Patent No.: US 7,349,833 B2
(45) Date of Patent: Mar. 25, 2008

(54) 2D CENTRAL DIFFERENCE LEVEL SET PROJECTION METHOD FOR INK-JET SIMULATIONS

(75) Inventor: Jiun-Der Yu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 571 days.

(21) Appl. No.: 10/957,349

(22) Filed: Oct. 1, 2004

(65) Prior Publication Data

US 2006/0070434 A1   Apr. 6, 2006

(51) Int. Cl.
*G06G 7/50* (2006.01)
(52) U.S. Cl. .............................. 703/9; 703/2
(58) Field of Classification Search .................... 703/9, 703/2

See application file for complete search history.

(56) References Cited

U.S. PATENT DOCUMENTS

| | | | |
|---|---|---|---|
| 6,179,402 B1 | 1/2001 | Suzuki et al. | |
| 6,257,143 B1 | 7/2001 | Iwasaki et al. | |
| 6,283,568 B1 | 9/2001 | Horii et al. | |
| 6,315,381 B1 | 11/2001 | Wade et al. | |
| 6,322,186 B1 | 11/2001 | Shimizu et al. | |
| 6,322,193 B1 | 11/2001 | Lian et al. | |
| 6,611,736 B1 * | 8/2003 | Waite et al. ................. 700/281 |
| 2003/0182092 A1* | 9/2003 | Yu et al. ......................... 703/9 |
| 2004/0181383 A1* | 9/2004 | Yu et al. ......................... 703/9 |

OTHER PUBLICATIONS

Shield et al. "Drop formation by DOD ink-jet nozzles: A comparison of experiment and numerical simulation"; 1987; IBM J. Res. Develop.; pp. 96-110.*

Tanaka et al.; "The cubic Interpolated level set method for realistic fluid animation"; 2003; ACM; pp. 1-3.*

Chen et al.; "A Simple Level Set Method for Solving Stefan Problems"; 1997; Academic Press; pp. 8-29.*

Foster et al.; "Realistic Animation of Liquids"; 1996; University of Pennsylvania; pp. 1-24.*

Yu, J., et al., "A Coupled Level Projection Method Applied to Ink Jet Simulation", Interfaces and Free Boundaries, vol. 5, No. 4, 2003, pp. 459-482.

"Projection Method for Viscous Incompressible Flow on Quadrilateral Grids", John B. Bell, et al., AIAA Journal, vol. 32, No. 10, Oct. 1994, pp. 1961-1969.

"A Second-Order Projection Method for the Incompressible Navier-Stokes Equations", John B. Bell, et al., Journal of Computational Physics, vol. 85, No. 2, Dec. 1989, pp. 257-283.

(Continued)

*Primary Examiner*—Paul Rodriguez
*Assistant Examiner*—Jason Proctor

(57) ABSTRACT

A coupled level set projection method is incorporated into a finite-difference-based ink-jet simulation method to make the simulation easier and faster to run and to decrease the memory requirements. The coupled level set projection method is based on a central difference discretization on uniform rectangular grids. A constructed numerical projection operator, in the form of either a finite difference projection operator or a finite element projection operator, can be used in the central difference scheme, in which case the resulting linear systems can be solved by a multi-grid method. The finite difference projection operator is used when the fluid velocity is located at grid points and the pressure at cell centers, whereas the finite element projection operator is used when the fluid velocity is located at cell centers and the pressure at grid points.

6 Claims, 9 Drawing Sheets

OTHER PUBLICATIONS

"Computing Minimal Surfaces via Level Set Curvature Flow", David L. Chopp, Mathematics Department, University of California, Berkeley, California, Journal of Computational Physics 106, pp. 77-91, 1993.

"Fronts Propagating with Curvature-Dependent Speed: Algorithms Based on Hamilton-Jacobi Formulations", Stanley Osher, Department of Mathematics, University of California, Los Angeles and James A. Sethian, Department of Mathematics, University of California, Berkeley, California, Journal of Computational Physics 79, pp. 12-49, 1988.

"A Level Set Approach for Computing Solutions to Incompressible Two-Phase Flow", Mark Sussman, et al., Department of Mathematics, University of California, Los Angeles, California, Journal of Computational Physics 114, pp. 146-159, 1994.

"A Projection Method for Incompressible Viscous Flow on Moving Quadrilateral Grids", David P. Trebotich, Department of Mechanical Engineering, University of California, Berkeley, California and Phillip Colella, Applied Numerical Algorithms Group, Lawrence Berkeley National Laboratory, Berkeley, California, Journal of Computational Physics 166, pp. 191-217, 2001.

"A Second-Order Projection Method for Variable-Density Flows", John B. Bell, et al., Lawrence Livermore National Laboratory, Livermore, California, Journal of Computational Physics 101, pp. 334-348, 1992.

* cited by examiner t=0 t=0.5 t=1 t=1.5 t=2 t=2.5

2D CENTRAL DIFFERENCE LEVEL SET PROJECTION METHOD FOR INK-JET SIMULATIONS

RELATED APPLICATION DATA

This application is related to application Ser. No. 10/390,239, filed on Mar. 14, 2003 and entitled "Coupled Quadrilateral Grid Level Set Scheme for Piezoelectric Ink-Jet Simulation." The disclosure of this related application is incorporated herein by reference and referred to in the following description as "related application."

BACKGROUND OF THE INVENTION

1. Field of the Invention

The present invention relates to an improved model and accompanying algorithm to simulate and analyze ink ejection from a piezoelectric print head. The improvements to the simulation model and algorithm include the development of a central difference scheme for the coupled level set projection method for two-phase flows, and also to the construction of multi-grid-compatible discrete projection operators that can be used in the central difference scheme. The simulation model and algorithm may be embodied in software and run on a computer, with the time-elapsed simulation viewed on an accompanying monitor.

2. Description of the Related Art

The above-identified related application discloses a coupled level set projection method on a quadrilateral grid. In that invention, the velocity components and level set are located at cell centers while the pressure is at grid points. The Navier-Stokes equations are first solved in each time step without (considering the condition of incompressibility. Then, the obtained velocity is "projected" into a space of a divergence-free field. A Godunov upwind scheme on quadrilateral grids is used to evaluate the convection terms in the Navier-Stokes equations and the level set convection equation. A Taylor's expansion in time and space is done to obtain the edge velocities and level sets. Since the extrapolation can be done from the left and right hand sides for a vertical cell edge and can be done from the upper and lower sides for a horizontal edge, there are two extrapolated values at each cell edge (see equations (50)-(52) of the related application). Then, the Godunov upwind procedure is employed to decide which extrapolated value to take (see equations (53) and (54) of the related application). In the Godunov upwind procedure, a local Riemann problem is actually solved. For a Newtonian fluid, the local Riemann problem reduces to the one-dimensional Burger's equation, which has very simple solutions as given by equations (53) and (54) of the related application. So, basically, the local velocity direction decides which extrapolated value to use for a Newtonian fluid. However, if the fluid is not a Newtonian fluid, the local Riemann problem may not have simple solutions, and the Godunov upwind procedure would be very difficult to program as a result. The advantage of this kind of upwind scheme for advection terms is lower grid viscosity and higher numerical resolution. Its disadvantage is the increased code complexity needed to do the Taylor's extrapolation in both time and space and Godunov's upwind procedure.

OBJECTS OF THE INVENTION

In consideration of the foregoing, it is an object of the present invention to provide an improved model and accompanying algorithm to simulate and analyze ink ejection from a piezoelectric print head.

It is a further object to include in the improved model and algorithm a central difference scheme for the coupled level set projection method, and to optionally further include multi-grid-compatible discrete projection operators that can be used in the central difference scheme.

SUMMARY OF THE INVENTION

In the central difference scheme of this invention, the Navier-Stokes equations are again first solved in each time step without considering the condition of incompressibility. Then, the obtained velocity is "projected" into a space of divergence-free field. But, in contrast to the upwind scheme of the related application, the central difference scheme here uses staggered cell averages and the direction of local velocity is not important. Taylor's extrapolation in time is still used in calculating the time-centered velocity and level set predictors. But since it is only an extrapolation in time, the code implementation is much easier. One characteristic of the scheme is, if at time step $t=t^n$ the velocities and level set are located at cell centers, they will be located at grid points at the next time step $t=t^{n+1}$. The velocities and level set will be at cell centers again at time step $t=t^{n+2}$. That the velocities and level set alternate locations over the series of time steps is why the method is described as using "staggered" grids.

To improve the performance of the central difference scheme, two discrete projection operators are constructed to project the velocity into a divergence-free space. The linear systems resulting from the projection operators can be quickly solved by the multi-grid method. The projection operators include a finite difference projection and a finite element projection, which are used in different conditions. The finite difference projection operator is used when the velocity is located at grid points and the pressure at cell centers. The finite element projection operator is used when the velocity is located at cell centers and the pressure at grid points. When the finite difference projection is adopted, the cell density is lagged in time by one half time step. This cell density time delay is referred to as "retarded" density.

The advantages of the central difference scheme, as contemplated by this invention, include (i) easy implementation; (ii) lower computer memory requirement; and (iii) easier generalization for application to non-Newtonian fluid flows.

According to one aspect of this invention, a method for simulating and analyzing fluid ejection from a channel is provided. Preferably, the channel comprises an ink-jet nozzle that is part of a piezoelectric ink-jet head. There is a boundary between a first fluid (e.g., ink) that flows through the channel and a second fluid (e.g., air). The method comprises the steps of: (a) formulating a central-difference-based discretization on a uniform rectangular grid; (b) performing finite difference analysis on the uniform rectangular grid using the central-difference-based discretization to solve equations governing the flow of at least the first fluid through the channel; and (c) simulating the flow of the first fluid through, and ejection from, the channel based on the performed finite difference analysis.

Preferably, in performing step (b), a level set method is used to capture characteristics of the boundary in the channel.

Preferably, the uniform rectangular grid comprises a plurality of cells, and the central-difference-based discretization is formulated such that, for each cell there is a velocity vector for determining velocity of the first fluid and a level set value for capturing characteristics of the boundary in the channel. The corresponding velocity vector and level set value for each cell are located at an approximate center of the cell at one time point and at a grid point of the cell at a next time point.

Preferably, step (a) includes constructing multi-grid compatible projection operators, including a finite difference projection operator and a finite element projection operator.

Preferably, in step (b), finite difference analysis is performed on the uniform rectangular grid using the central-difference-based discretization to solve equations governing the flow of at least the first fluid through the channel in each cell at each time point, the finite difference projection operator being applied after step (b) is performed with the velocity vectors and level set values being located at the grid points and the finite element projection operator being applied after step (b) is performed with velocity vectors and level set values being located at the approximate cell centers.

In another aspect, the invention involves an apparatus for simulating and analyzing fluid ejection from a channel with a boundary between a first fluid that flows through the channel and a second fluid. The apparatus comprises one or more components or modules that is/are configured to perform the processing described above. Some or all of the processing may be conveniently specified by a program of instructions that is embodied in software, hardware, or combination thereof. One of the components preferably includes a display for enabling visual observation of the simulation.

In accordance with further aspects of the invention, various aspects of the invention may be embodied in a program of instructions, which may be in the form of software that may be stored on, or conveyed to, a computer or other processor-controlled device for execution. Alternatively, the program of instructions may be embodied directly in hardware (e.g., application specific integrated circuit (ASIC), digital signal processing circuitry, etc.), or such instructions may be implemented as a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

I. Introduction

Figure 1:
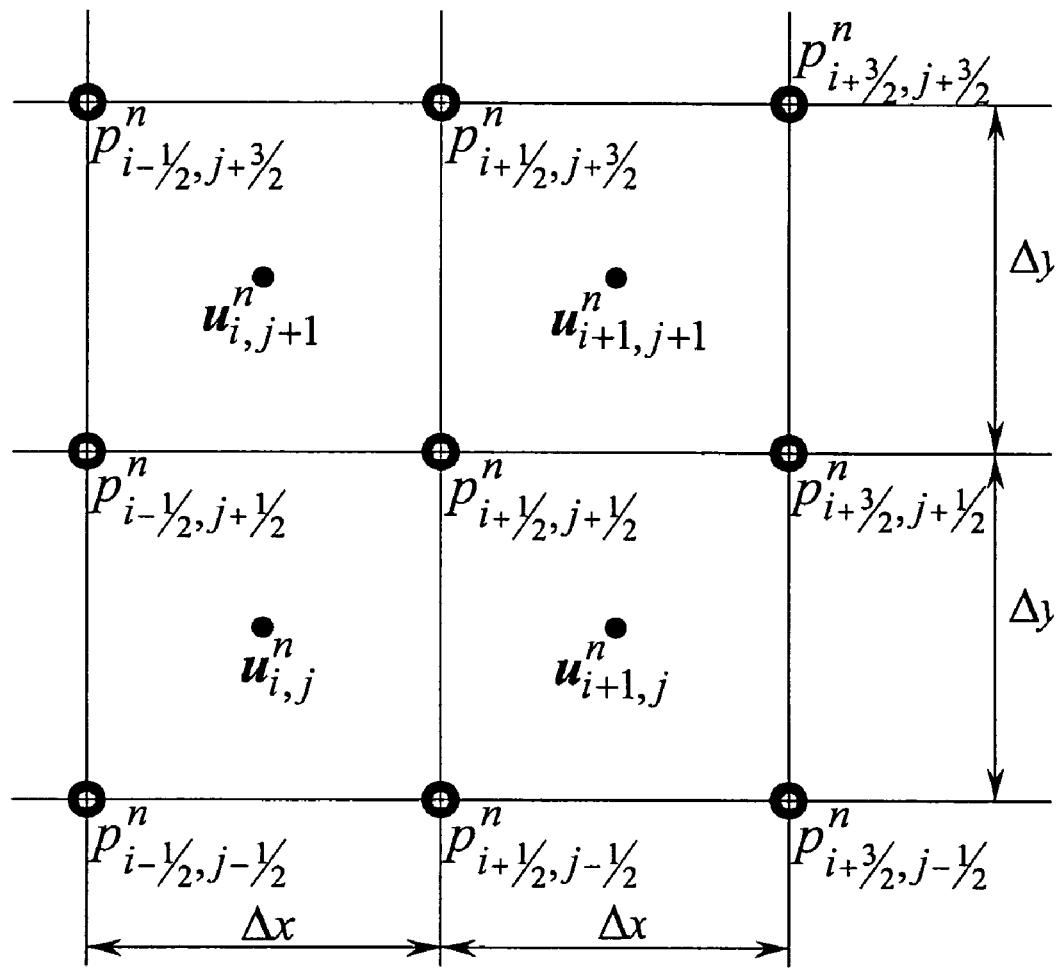
FIG. 1 is a schematic diagram of a grid showing the locations of velocity and pressure at $t=t^n$.

This invention is regarding the development of a central difference level set projection method on uniform rectangular grids for two-dimensional two-phase flow, especially ink jet, simulations. The Navier-Stokes equations are first solved in each time step without considering the condition of incompressibility. The obtained velocity is then "projected" into a space of divergence-free field. In contrast to the upwind scheme of the related application, the central difference scheme here uses staggered cell averages and the direction of local velocity is not important. To solve the Navier-Stokes equations, the velocity and level set slopes are first calculated. Taylor's extrapolation in time is used in calculating the time-centered velocity and level set predictors. These predictors are then employed to calculate the velocity corrector, which is not divergence-free.

One characteristic of the scheme is, if at time step $t=t^n$ the velocities and level set are located at cell centers, they will be located at grid points at the next time step $t=t^{n+1}$. The velocities and level set will be at cell centers again at time step $t=t^{n+2}$. That the velocities and level set alternate locations over the series of time steps is why the method is described as using "staggered" grids.

To improve the performance of the central difference scheme, two discrete projection operators are constructed to project the velocity into a divergence-free space. The linear systems resulting from the projection operators can be quickly solved by the multi-grid method. The projection operators include a finite difference projection and a finite element projection, which are used in different conditions. The finite difference projection operator is used when the velocity is located at grid points and the pressure at cell centers. The finite element projection operator is used when the velocity is located at cell centers and the pressure at grid points. When the finite difference projection is adopted, the cell density is lagged in time by one half time step. This cell density time delay is referred to as "retarded" density.

The invented central difference algorithm is faster than the simulation algorithm using the Godunov upwind scheme and has lower computer overhead requirements because: (1) only the Taylor's extrapolation in time is employed instead of the Taylor's extrapolation in both time and space; (2) no local Riemann problem to solve; (3) only one projection equation to solve in each time step (there are two, i.e. the MAC projection and FEM projection, to solve in each time step in the related application).

II. Equations of Motion

The following description explains how to extend the central difference scheme for single phase fluid by Kupferman and Tadmor to two-phase flow simulations. The governing equations to solve in ink-jet simulations are identified in this section and are set forth in the Appendix along with the other numbered equations referenced herein. Since I prefer to use a conservation form for advection terms, the Navier-Stokes equations and the level set convection equation are slightly different from those presented in the related application. The central difference scheme for two-phase flows and a flow chart illustrating an embodiment of the algorithm are explained in section III. Two discrete projection operators, which are compatible with the fast multi-grid method, are described in section IV. Simulation examples are given in section V.

A. Governing Equations

The governing equations for two-phase flows include the continuity equation (1) and the Navier-Stokes equations (2). In these equations, the rate of deformation tensor and the fluid velocity are respectively defined in equations (3).

$$\frac{D}{Dt} = \frac{\partial}{\partial t} + (u \cdot \nabla)$$

is the Lagrangian time derivative, $\rho$ the relative density, p the pressure, $\mu$ the relative dynamic viscosity, $\sigma$ the surface tension coefficient, $\kappa$ the curvature, $\delta$ the Dirac delta function, and $\phi$ the level set.

A level set formulation is used to define the interface between the two fluids, e.g., ink and air, and hence the relative density, relative dynamic viscosity, and curvature are all defined in terms of the level set $\phi$ as set forth in equation (4).

Here, the level set function $\phi$ is initialized as the signed distance to the interface, i.e., the level set value is the shortest distance to the interface on the liquid side and is the negative of the shortest distance on the air side. The unit normal on the interface, drawn from fluid 2 into fluid 1, and the curvature of the interface can be expressed in terms of $\phi$ as in equation (5).

To make the governing equations dimensionless, the following definitions, as set forth in equation (6), are chosen. The primed quantities are dimensionless, and $L, U, \rho_1, \mu_1$ represent the characteristic length, characteristic velocity, density of fluid 1, and dynamic viscosity of fluid 1, respectively. The characteristic velocity and characteristic length can be arbitrarily chosen, as they do not influence the result of simulation.

Substituting the relationships of equation (6) into equations (1) and (2) and dropping the primes, yields equations (7) and (8), where the relative density ratio $\rho(\phi)$, relative viscosity ratio $\mu(\phi)$, Reynolds number Re, and Weber number We are defined by equations (9).

Since the interface moves with the fluid, the evolution of the level set is governed by equation (10).

Since equations (5), (7) and (8) are expressed in terms of the vector notation, they assume the same form in Cartesian coordinates and axi-symmetric coordinates.

To describe this invention, I favor the use of a conservation form for the convection terms. Hence, equations (8) and (10) are rewritten as equations (11) and (12) respectively. The equivalence of equations (8), (10) and (11), (12) can be confirmed by expanding the convection terms. For example, in equation (12), the expansion is set forth in equation (13). The last equivalence holds as long as the fluid is incompressible, i.e., as long as $\nabla \cdot u = 0$.

B. Boundary Conditions

On solid walls it is assumed that both the normal and tangential components of the velocity vanishes, although this assumption must be modified at the triple point. At both inflow and outflow the formulation of this invention allows us to prescribe either the velocity (14) or the pressure (15) boundary condition. In equation (15), the symbol n denotes the unit normal to the inflow or outflow boundary. For ink-jet simulations, time-dependent inflow conditions are provided by an equivalent circuit model which mimics the charge-driven mechanism which forces ink from the bath into the nozzle.

C. Contact Models

At the triple point, where air and ink meet at the solid wall, the slipping contact line model as presented in application Ser. No. 10/105,138, filed on Mar. 22, 2002 and entitled "A Slipping Contact Line Model and the Mass-Conservative Level Set Implementation for Ink-Jet Simulation" is used. The disclosure of this application is incorporated herein by reference.

III. The Central Difference Scheme

The numerical algorithm is now formulated on uniform rectangular grids. In the following, the superscript n (or n+1) denotes the time step, i.e., equation (16), and so on.

Given quantities $u^n$, $p^n$, $\phi^n$, the purpose of the algorithm is to obtain $u^{n+1}$, $p^{n+1}$, $\phi^{n+1}$ which satisfy the condition of incompressibility. The explicit algorithm described herein is first-order accurate in time and second-order accurate in space.

A. Smearing of the Interface

Because of the numerical difficulty caused by the Dirac delta function and by the abrupt change of the density and viscosity across the interface, the Heaviside and Dirac delta functions are replaced with smoothed ones, i.e., to smear the interface a little bit. The Heaviside function is redefined by equation (17). Hence, the smoothed delta function is as set forth in equation (18).

The parameter $\epsilon$ is usually chosen to be proportional to the average size of cells as set forth in (19), where $\Delta x$ is the average size of the rectangular cells. I usually choose an $\alpha$ between 1.7 and 2.5.

The density and viscosity hence become as set forth in equations (20).

B. The Central Scheme

The grid is composed of uniform rectangular cells of size $\Delta x \times \Delta y$. These cells are centered at $(x_i = (i-1/2)\Delta x, y_j = (j-1/2)\Delta y)$. At time step $t^n$, it is assumed that the discrete velocity $u^n = (u_{i,j}, v_{i,j})$ and level set $\phi_{i,j}$ are located at cell centers while the pressure $p_{i,j}^n$ is at grid points, as shown in FIG. 1. The purpose is to obtain the velocity, pressure and level set at $t = t^{n+1}$.

B.1. Interpolation

The first stage is to linearly reconstruct the field from the discrete velocity and level set values at cell centers, as set forth in equations (21). In these equations, $$\frac{u'_{i,j}}{\Delta x} \text{ and } \frac{u_{i,j}}{\Delta y}\left(\frac{\phi'_{i,j}}{\Delta x} \text{ and } \frac{\phi_{i,j}}{\Delta y}\right),$$

are the discrete velocity (level set) slopes in the x and y directions, respectively. There are several ways to calculate these slopes. For example, one can employ the second-order monotonicity-limited slopes as was discussed in equations (60)-(62) in the above-identified related application. Alternatively, as is preferred here, these slopes are calculated using the simple central differences set forth in equations (22).

B.2. Predictor

The second stage is to obtain the velocity and level set predictors at $t=t^{n+1/2}$. This can be easily done by Taylor's expansion in time, as per equation (23). The time derivatives on the right hand side of (23) are evaluated by substituting equations (11) and (12) which results in equations (24). After the level set predictor $\phi_{i,j}^{n+1/2}$ at cell centers is obtained, the time-centered densities ($\rho(\phi^{n+1/2})$) and viscosities ($\mu(\phi^{n+1/2})$) are calculated using equation (20). Note that these densities and viscosities are still cell-centered at $t=t^{n+1/2}$.

B.3. Corrector

Figure 2:
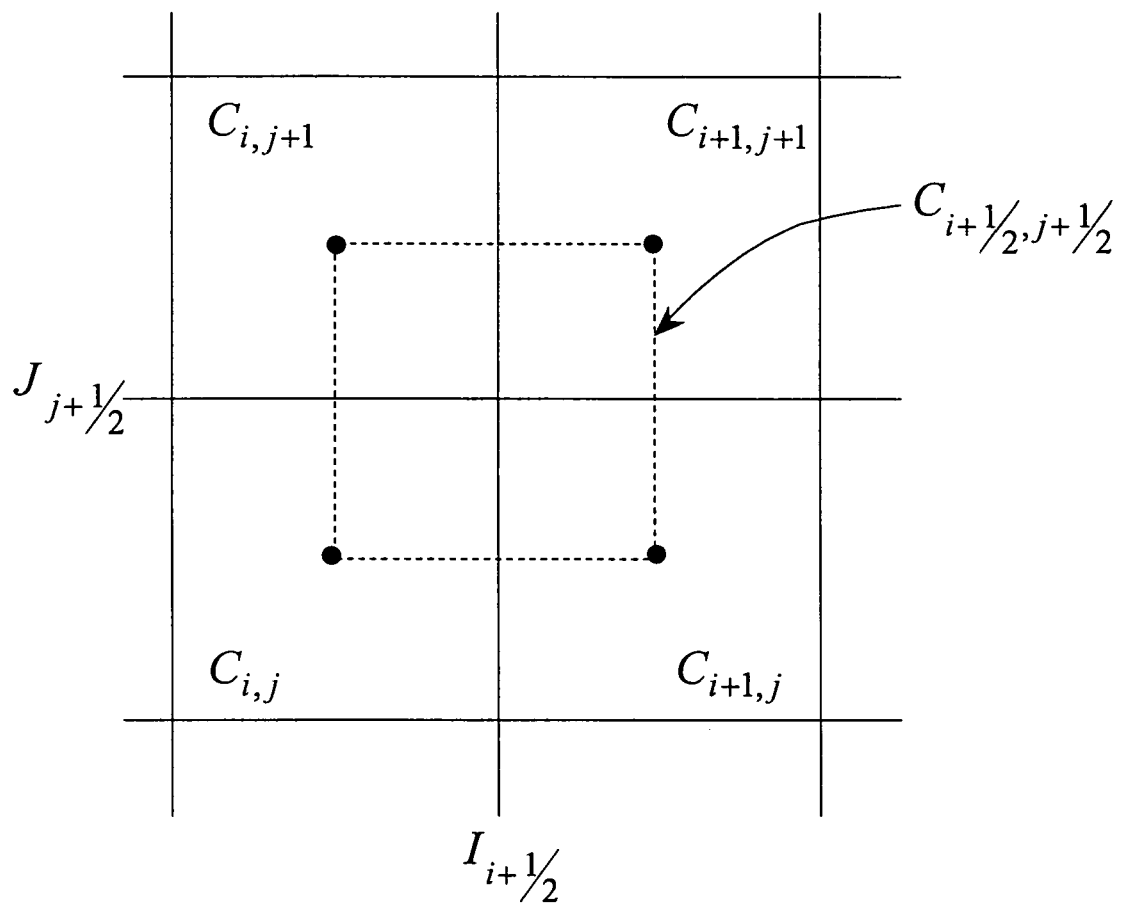
FIG. 2 is a schematic diagram of a staggered grid for use in embodiments of the invention.

The third stage is to evolve the piecewise linear approximants (21) at $t^n$ to $t^{n+1}$. The new velocity field and level set are first realized by their staggered cell averages as set forth in equations (25). The central difference nature of the scheme is strongly linked to the staggered averages in (25), which should be integrated in the control box $C_{i+1/2,j+1/2} \times [t^n, t^{n+1}]$ shown in FIG. 2. Taking the level set convection equation as an example, substitute equation (26) into the first equation in (25) to yield equation (27). For the first term on the right hand side of equation (27), plug in the linearly reconstructed level set (i.e., the second equation in (21)). For the second and third terms, use the mid-point quadrature in space and time. Taking the second term as an example, the substitution is shown in equation (28), where the time-centered quantities are those velocity and level set predictors obtained in the previous stage, and the derivative operator $D_x^+$ and average operator $\mu_y^+$ are defined as shown in equations (29). In the following, I use similarly defined derivative and average operators such as $D_y^+$, $D_x^-$, $\mu_x^+$, etc., which are defined similar to (27).

After plugging in the linearly reconstructed field and the predictors, the staggered level set average in equation (27) becomes as shown in equation (30). Similarly, the velocity field is as set forth in equations (31) and (32).

Note that these level set and velocity correctors at $t=t^{n+1}$ are located at grid points. Since the incompressibility condition has not been reinforced, the velocity field given by equations (31) and (32) is not divergence-free.

B.4. Projection for $u^{n+1}$

The velocity field $u^{n+1}$ at $t=t^{n+1}$ set forth in equation (33) is incompressible. If we apply the divergence operator on both sides of (33) and note $\nabla \cdot u^{n+1}=0$, the result in equation (34) is obtained. The projection equation (34) is elliptic. It reduces to a Poisson's equation if the density ratio $\rho(\phi^{n+1/2})$ is a constant. The finite element formulation of the projection equation is shown in equation (35), where $\Gamma_1$ denotes all the boundaries where the inflow or outflow velocity $u^{BC}$ is given. It can be verified by the divergence theory that the implied boundary condition at $\Gamma_1$ is as shown in equation (36). It is noticeable that the second term on the right hand side of (35) vanishes if boundary pressures are given at both the inflow and outflow. The projection step can be done by either discretizing equation (34) or (35).

After the pressure $p^{n+1}$ is solved from equation (34) or (35), the velocity field $u^{n+1}$ can be obtained by equation (33).

B.5. Staggered Nature

According to the previous subsections, the central difference scheme first integrates the Navier-Stokes equations without the continuity condition. At $t=t^n$ the velocity and level set are located at cell centers while the pressure at grid points. The time-centered velocity and level set predictors are first calculated using the Taylor's expansion in time. The time-centered density predictor is calculated using the time-centered level set. These predictors, which are located at cell centers, are then used to calculate the velocity and level set correctors at grid points. Since we want the relative position between the pressure and velocity to remain the same, the velocity $u^{n+1}$ obtained in the projection step is located at grid points and the pressure $p^{n+1}$ at cell centers.

The situation from $t=t^{n+1}$ to $t=t^{n+2}$ is the other way around. At $t=t^{n+1}$ the velocity is located at grid points and the pressure at cell centers. The central difference scheme first calculates the time-centered velocity and level set predictors at grid points. These predictors are then used to obtain the correctors at cell centers. After the projection is done, the incompressible velocity $u^{n+2}$ is located at cell centers and the pressure $p^{n+2}$ at grid points. Since the location of the discrete velocity and pressure in our numerical scheme changes every time step, it has what is referred to as a "staggered nature."

C. Re-Initialization of the Level Set

To correctly capture the interface and accurately calculate the surface tension, the level set needs to be maintained as a signed distance function to the interface. However, if the level set is updated by equation (7), it will not remain as such. Therefore, instead, the simulation is periodically stopped and a new level set function $\phi$ is recreated which is the signed distance function, i.e., $|\nabla\phi|=1$, without changing the zero level set of the original level set function.

The need to do so in level set calculations has been previously recognized, as has re-initialization. A direct and simple method for re-initialization is to first find the interface (the zero level set) using a contour plotter and then recalculate the signed distance from each cell to the interface. Another simple re-initialization choice is to solve the crossing time problem as set forth in equation (37), where F is a given normal velocity. It is noticeable that t' has been used in equation (37) to emphasize that it is a pseudo time variable and the equation is solved solely for the purpose of re-initialization. With F=1, flow the interface forward and backward in time and calculate the time t' at which the level set function changes sign for each cell. The crossing times (both positive and negative) are equal to the signed distances. Either of these two simple methods is suitable for use with the present invention. Both have been tried with no noticeable difference in simulation results.

An even better re-initialization scheme for use in this invention is described in application Ser. No. 10/729,637, filed on Dec. 5, 2003 and entitled "Selectively Reduced Bi-cubic Interpolation for Ink-Jet Simulations on Quadrilateral Grids" is used. The disclosure of this application is incorporated herein by reference. This re-initialization scheme exhibits much better mass conservation performance.

D. Constraint on Time Step

Since the time integration scheme is second-order explicit for the convection term and first-order explicit for viscosity, the constraint on time step $\Delta t$ is determined by the CFL condition, surface tension, viscosity, and total acceleration, as shown in equation (38), where $h=\min(\Delta x, \Delta y)$ and $F^n$ is defined in equation (19).

E. The Flowchart

Figure 3:
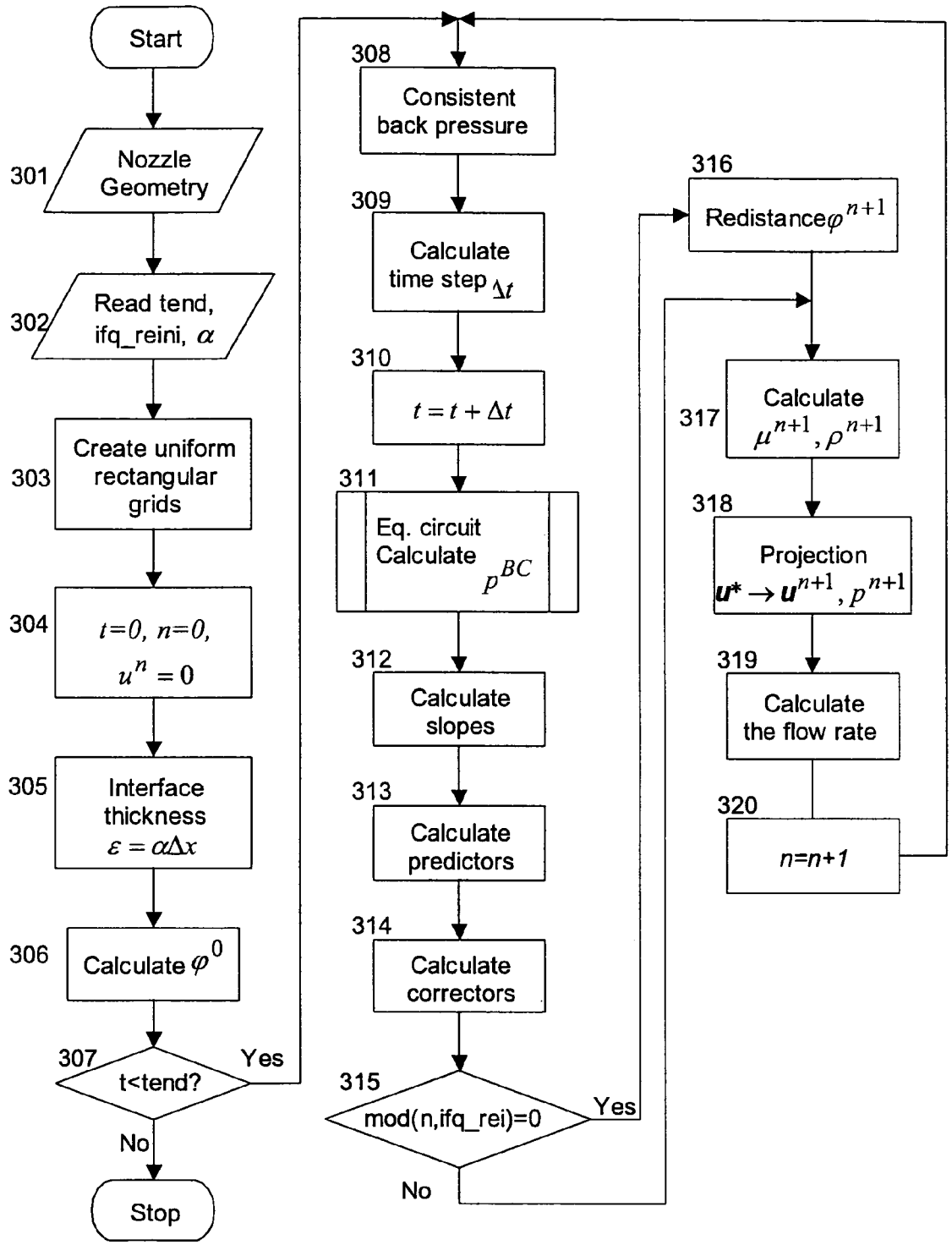
FIG. 3 is a flow chart illustrating the algorithm according to an embodiment of the invention.

As shown by the flowchart in FIG. 3, the numerical algorithm is basically sequential. The code first reads the nozzle geometry (step 301) and also reads control parameters like tend (end time of the simulation), $\alpha$ (the extent of interface smearing), ifq_reini (how often the level set should be re-initialized) (step 302). With the given nozzle geometry, the code creates a uniform rectangular grid (step 303). The time and the number of the current time step are set to zero and the initial fluid velocity is set to zero everywhere (step 304). With the given smearing parameter ($\alpha$), the interface thickness is set using equation (19) (step 305). The level set is then initialized by assuming that the initial ink-air interface is flat (step 306).

Now the time loop starts by checking whether t<tend (step 307). If so, the consistent back pressure is determined following the procedure in application Ser. No. 10/652,386, filed on Aug. 29, 2003 and entitled "Consistent Back Pressure for Piezoelectric Ink-Jet Simulation," the disclosure of which is incorporated by reference herein (step 308). The time step is then determined by equation (38) to ensure the stability of the code (step 309). The time is updated (step 310). The time step and the ink flow rate (the initial flow rate is zero) are then passed to an equivalent circuit or like analytic tool, which calculates the inflow pressure for the current time step (step 311). After receiving the inflow velocity from the equivalent circuit, the CFD code proceeds to solve the partial differential equations. The slopes of velocities and level set are first calculated following equation (22) (step 312). The predictors are then calculated using equations (24) (step 313). The time-centered viscosity and density are also calculated once the level set predictor is obtained. The velocity and level set correctors are calculated by the use of equations (30) to (32) (step 314). For every ifq_reini time steps, the level set is also re-distanced (steps 315 and 316). The new fluid viscosity and density are calculated using the new level set values (step 317). The velocity field is projected into the divergence-free space to get the new pressure and incompressible velocity fields (step 318). The last things to do in the loop are calculating the ink flow rate (step 319) and updating the number of the time step (step 320).

IV. Multi-Grid-Compatible Projections

In this section, the construction of discrete projection operators that are compatible with the multi-grid methods is described. The central difference scheme explained in the previous section has the "staggered" characteristic; that is, two discrete projection operators are needed, one with the pressure located at cell centers and the other with the pressure located at grid points. Here I propose a finite difference projection and a finite element projection. They are employed alternatively in simulations. The finite difference projection operator is used when the velocity is located at grid point and the pressure at cell centers. The finite element projection operator is used when the velocity is located at cell centers and the pressure at grid points. When the finite difference projection is adopted, the cell density is lagged in time by one half time step, referred to as "retarded" density.

A. Projection for $t=t^{n+1}$

Figure 4:
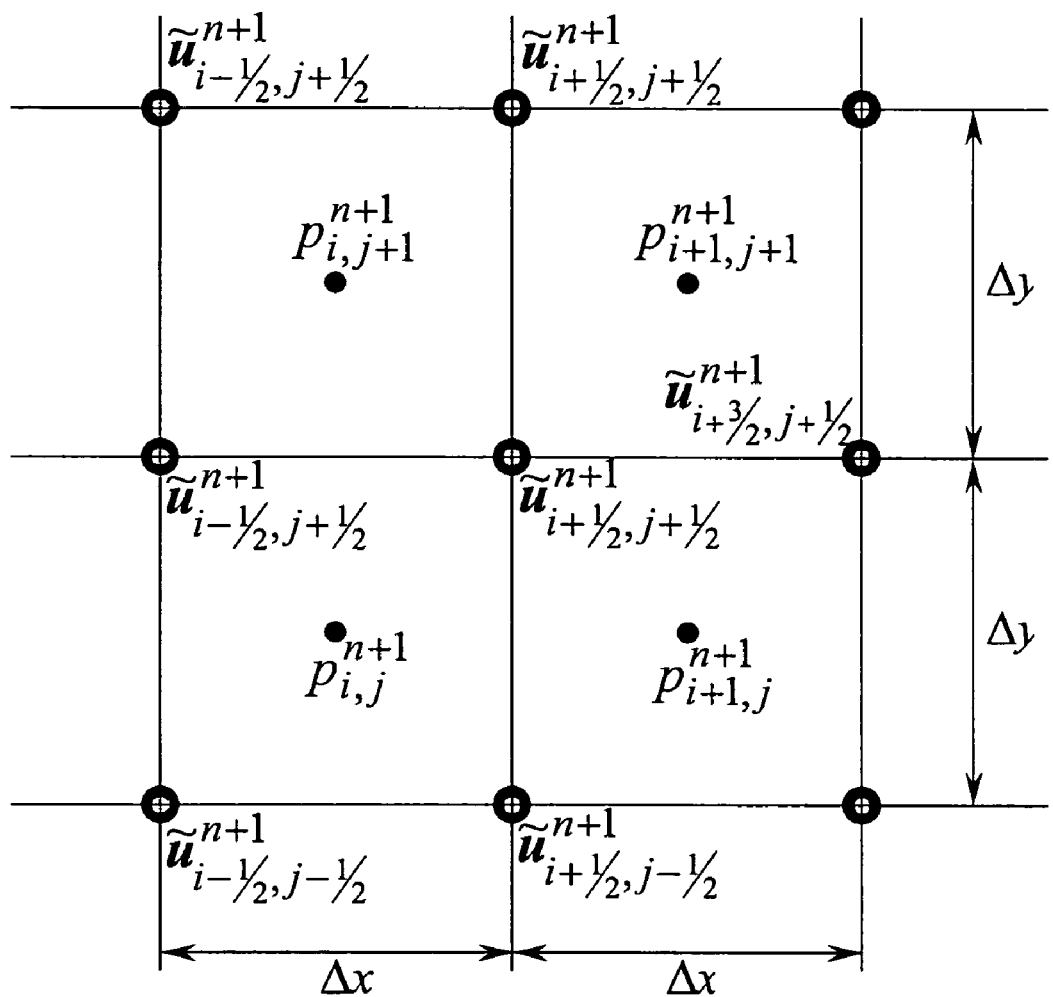
FIG. 4 is a schematic diagram illustrating the location of the non-divergence-free velocity corrector and pressure at $t=t^{n+1}$.

According to the previous section, the velocity at the end of $t=t^{n+1}$ is located at grid points if it is at cell centers at $t=t^n$. Since we want the relative position between the pressure and velocity to remain the same, the pressure to be solved, i.e. $p^{n+1}$, in the projection step should be located at cell centers. The relative position is shown in FIG. 4, where the "tilde" in $\tilde{u}^{n+1}$ denotes that these velocities are velocity correctors that are not incompressible. Note that the density corrector, which is not shown, is also located at grid points.

The finite element method (FEM) projection can be used to calculate the pressure and obtain the divergence-free velocity. The FEM projection can be discretized in a straightforward manner by letting the pressure be piecewise linear and the velocity gradient piecewise constant. An IMSL direct solver may be called to resolve the linear system. However, because the pressure is located at cell centers and the density is at grid points, it is very difficult, if not impossible, to apply the fast multi-grid method to solve the linear system to improve the code performance. The IMSL direct solver is very slow compared to the multi-grid method.

Thus, here the use of the finite difference projection (34) with the "slightly retarded" center density predictor is proposed. Referring to FIG. 4 and considering central difference, equation (34) can be discretized as is set forth in equation (39). The cell edge densities, like $\rho_{i+1/2,j}^{n+1/2}$ and $\rho_{i,j+1/2}^{n+1/2}$, are approximated by averaging the density predictors at cell centers. An example is given in equation (40). Note that the density predictors are obtained by using the level set predictors $\phi_{i,j}^{n+1/2}$ which is calculated by Taylor's expansion. Since both the pressure and the velocity in equation (39) are for $t=t^{n+1}$, the density used in the projection lags behind by half a time step. Thus, the density is referred to as "retarded density."

Boundary conditions are easy to implemented in the discrete equation (39). For example, if a solid wall boundary goes through the edge between cell (i,j) and (i+1,j), the Neumann condition dp/dn=0 needs to be enforced on the pressure. This can be simply done by using (41). Note that the no-slip condition on velocity has already been taken into account when the velocity predictors and correctors are calculated. Thus, there is no concern about the no-slip condition in the projection.

At the inflow, an inflow pressure is given, $p=p^{BC}$ and du/dn=0 needs to be satisfied. If, for example, the inflow boundary is located at the edge between cells (i,1) and (i,0), the inflow pressure can be easily implemented by setting (42). Again, there is no need to worry about the velocity condition at inflow, du/dn=0, when doing the projection because it is already accounted for in the predictor-corrector calculation.

The discretized projection equation (39) and the boundary conditions can be solved by the multi-grid method, which will be described in the next subsection. After the cell center pressures are solved, the incompressible velocity at grid points can be calculated by using equation (33).

B. Projection for $t=t^{n+2}$

At $t=t^{n+1}$, the velocity $u^{n+1}$ and level set $\phi^{n+1}$ are located at grid points and the pressure $p^{n+1}$ is located at cell centers. So, for $t=t^{n+2}$ the velocity $u^{n+2}$ and level set $\phi^{n+2}$ would be constructed at cell centers and the pressure $p^{n+2}$ at grid points.

Figure 5:
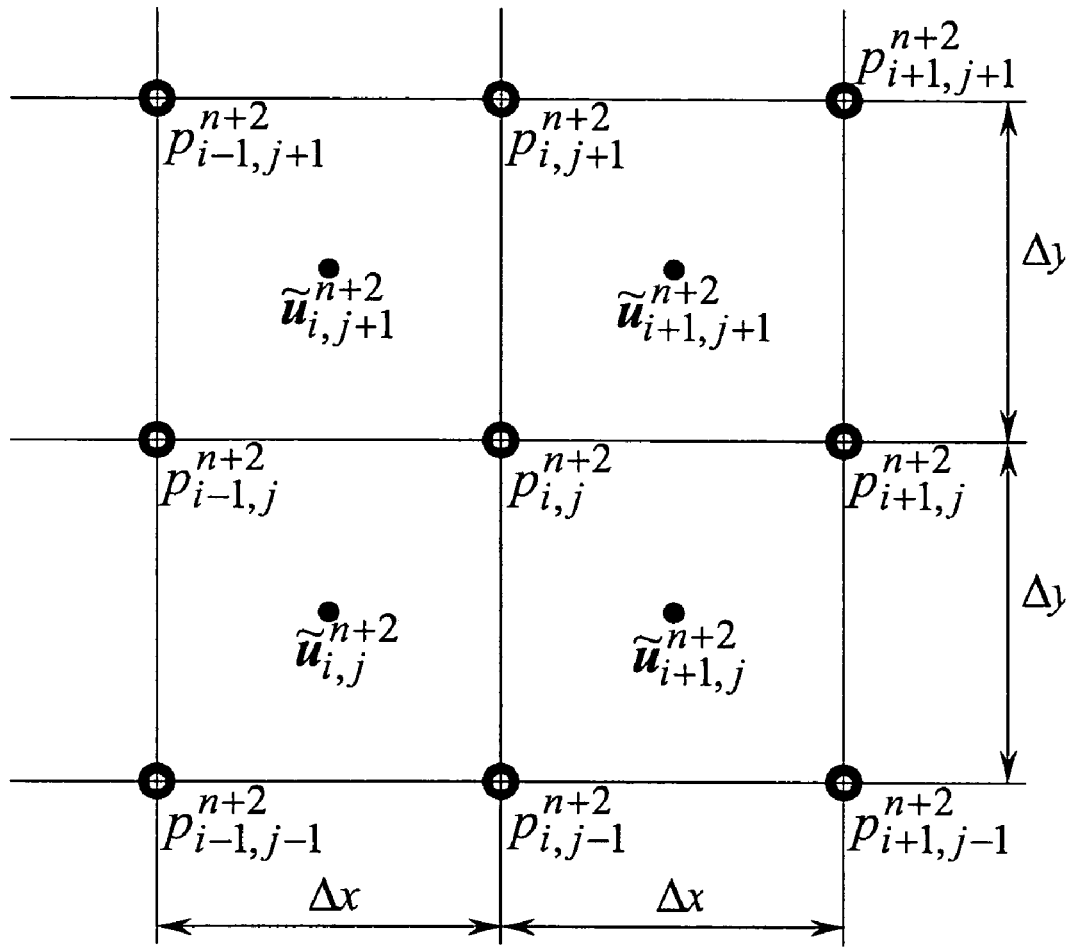
FIG. 5 is a schematic diagram illustrating the location of the non-divergence-free velocity corrector and pressure at $t=t^{n+2}$.

The FEM projection is adopted to obtain the incompressible velocity and pressure. The relative position between the correctors (not incompressible) and the pressure to be solved is shown in FIG. 5. The FEM projection equation, as is set forth in (43), should be used to facilitate the implementation. In (43), $\Gamma_1$ denotes all the boundaries where the inflow or outflow velocity $u^{BC}$ is given.

Here, a discretizaton of equation (43) that can work with the multi-grid method is needed. Since in FIG. 5 the pressure is located at grid points and the velocity and density at cell centers, the pressure can be approximates as a standard FEM piecewise bilinear function and the velocity a piecewise constant function. The testing function $\phi$ is also chosen to be piecewise bilinear and the discrete value is chosen to be collocated with the pressure. These choices are equivalent to saying that the continuous FEM operator at grid point (i+1/2,j+1/2) is (44). Note that (44) is the actual equation to discretize in the multi-grid code of this invention. Direct use of equation (43) in the discretization will cause the multi-grid solver to diverge.

On uniform rectangular grids, the left hand side of (44) can be discretized as (45) while the first term at the right hand side can be written as (46). The second term at the right hand side vanishes if there is no prescribed inflow/outflow velocity. For the case in which the inflow velocity is given, the second term is easy to calculate numerically. For example, if the inflow velocity is constant and the inflow boundary is horizontal and is located at the bottom of the solution domain (i.e., between cells (i,1) and (i,0)), the second term reduces to $v^{BC}/2\Delta y$, where $v^{BC}$ is the y component of the prescribed inflow velocity.

C. Implementation of the Multi-Grid Method

The multi-grid method tends to converge slowly or even diverge when it is applied to solve a Laplace equation that has rapidly changing coefficients. In ink-jet simulations, density ratios up to 1000:1 must be accommodated. Hence, the coefficient changes very rapidly across the ink-air interface. Care must be exercised when employing the multi-grid method to solve the linear system resulting from the projection. Since this invention does not directly pertain to the multi-grid method itself, the choices I adopt in coding the multi-grid solver are simply listed below:

- The discrete projection operators for the finest level are as defined in the previous two subsections.
- The typical multi-grid V-cycle is adopted.
- The multi-color Jacobi iteration is used in every level (except the coarsest level) to "relax" the linear system. The residual is restricted to be used in the next coarser level. The solution is interpolated and added to the next finer level.
- For problems with very high density ratio (for example, 1000:1), four multi-color Jacobi iterations are done for each level in the V-cycle, and 8-10 V-cycles are repeated to reduce the residual by seven to eight orders.
- The restriction operator and interpolation operator are bilinear and adjoining.
- Either the multi-color Jacobi iteration or the conjugate gradient method can be applied to solve the linear system at the bottom (coarsest) level. But the residual at the bottom level need not be exactly zero. But it should be at least two orders smaller than the requested solution accuracy.
- The numerical projection operators at coarser levels are defined exactly the same as the top (finest) level except the mesh size ($\Delta x$ and $\Delta y$) is increased by a factor of two.
- The cell densities in the coarser levels can be obtained by averaging those in the finer levels.

V. Numerical Example

Figure 6:
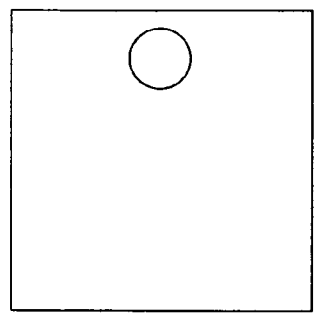
FIG. 6 is a simulation of a fluid bubble falling in a lighter surrounding fluid.
Figure 6:
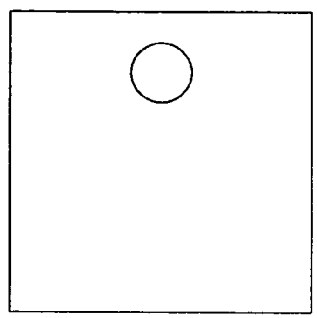
Figure 6:
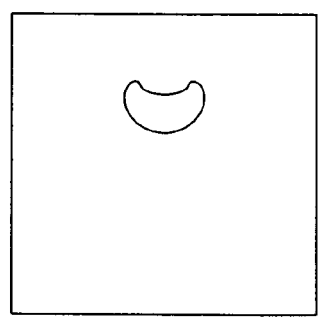
Figure 6:
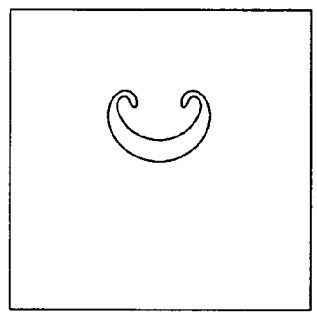
Figure 6:
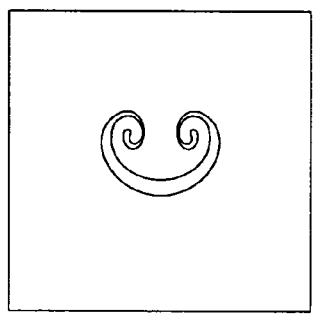
Figure 6:
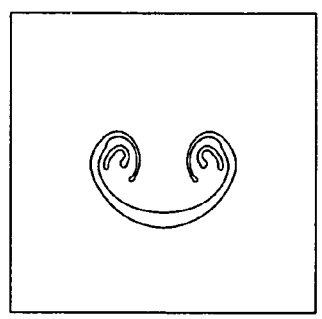

As a first example, consider the falling of a 2D fluid bubble surrounded by a second lighter fluid, as illustrated by the simulation in FIG. 6. Assume the original bubble is a circle of diameter 1. Its density is twice as high as the surrounding second fluid. The Reynolds number is chosen to be 400 while the Weber's number is set to be infinity (i.e., no surface tension). The solution domain is 5×5 and a 256×256 uniform square mesh is used for simulation. The time step is 0.005. As was pointed out above, either the IMSL direct solver or the multi-grid solver can be employed to resolve the linear system from the projections. The only difference is that, if the multi-grid solver is used, the discretization of the projections should be done as in the previous section; otherwise, the multi-grid solver may not converge. Note that only one set of results is plotted, because results obtained using the IMSL and the multi-grid solver are so close that there is no visual difference. On a Windows XP workstation with dual Xeon 2.8 GHz CPUs and 266 MHz ECC SDRAM, the simulation for 700 time steps using one CPU and the multi-grid solver takes about 930 seconds. The same simulation using the IMSL direct solver takes about 1700 seconds. Comparing the CPU time spent on resolving the linear system resulting from the discretization of the projections, the numbers are 1.38 seconds per system for the IMSL direct solver and 0.281 seconds for the multi-grid solver.

Figure 7:
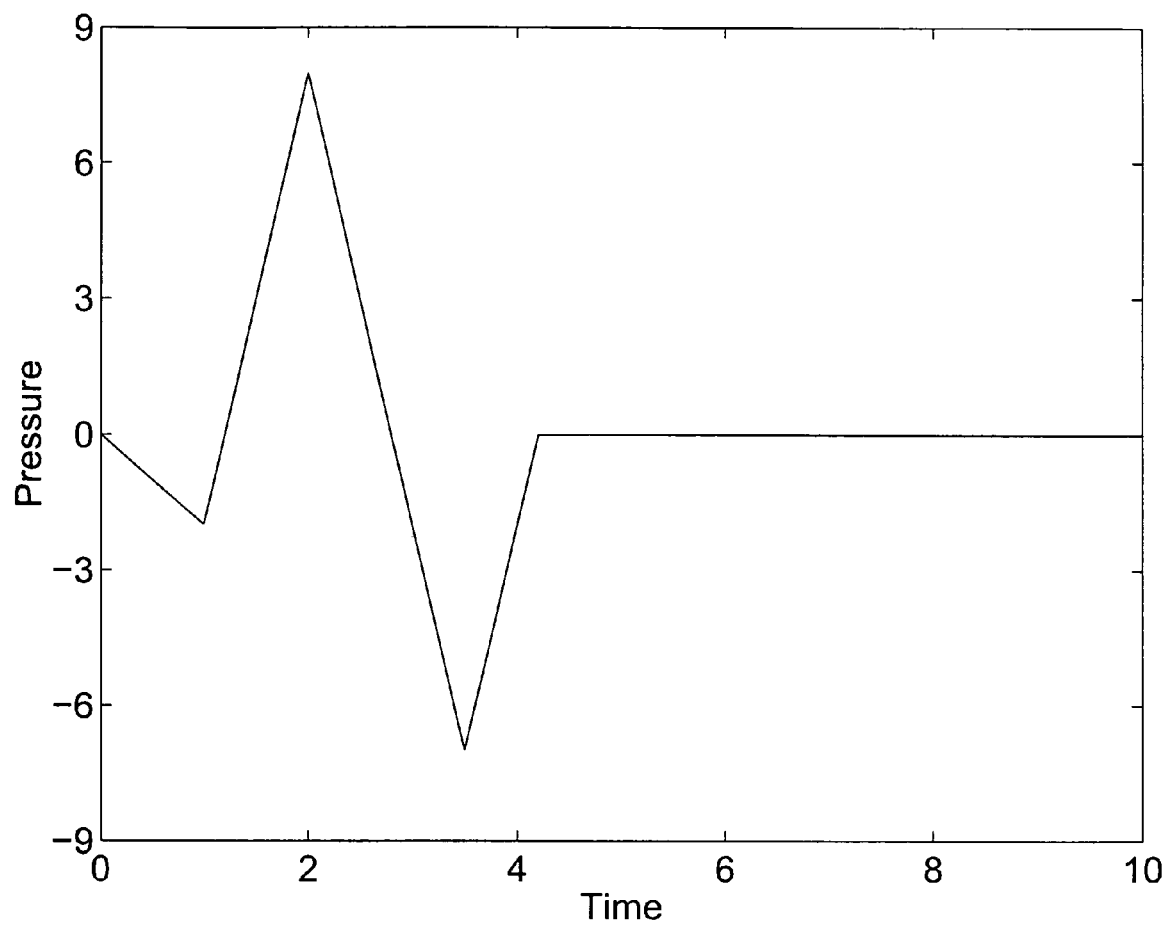
FIG. 7 is a the dynamic pressure that is applied at the nozzle inflow in the ink jet simulation.
Figure 8:
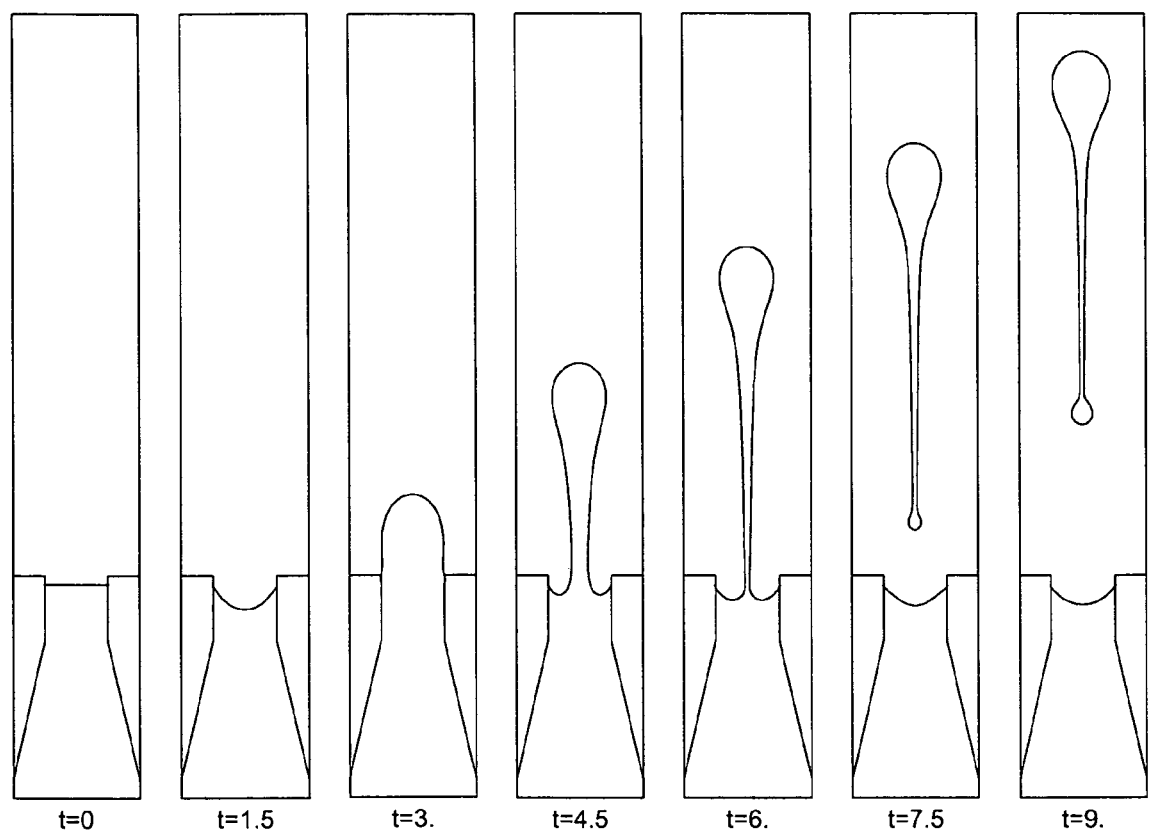
FIG. 8 is a simulation of a 2D droplet ejection.

For a second simple 2D example, consider the ejection of an ink droplet by the dynamic pressure in FIG. 7, where the maximum pressure is 8 and minimum is −7. The nozzle diameter is 1 at the opening and 2 at the bottom (inflow). The length of the nozzle opening part, i.e. the part whose diameter is 1, is 1. The length of the slant part is 2.2. The initial ink air interface is assumed to be flat and 0.1 down from the nozzle opening. Other parameters used in this simulation are: Reynolds number equals 50; Weber's number equals 31.3. The simulation result using a 32×336 rectangular grid is plotted in FIG. 8. The simulation (from t=0 to t=9) takes 900 time steps to finish and in each time step the code solves a 10750 by 10750 matrix system. The CPU time is 509 seconds on a 2.8 GHz Xeon Windows workstation with 266 MHz ECC SDRAM.

VI. Applications and Effects

As the foregoing demonstrates, the present invention provides a central difference scheme for the coupled level set projection method for two-phase ink-jet simulations. The invention also provides numerical projection operators so that the resulting linear system can be solved with a multi-grid method.

Figure 9:
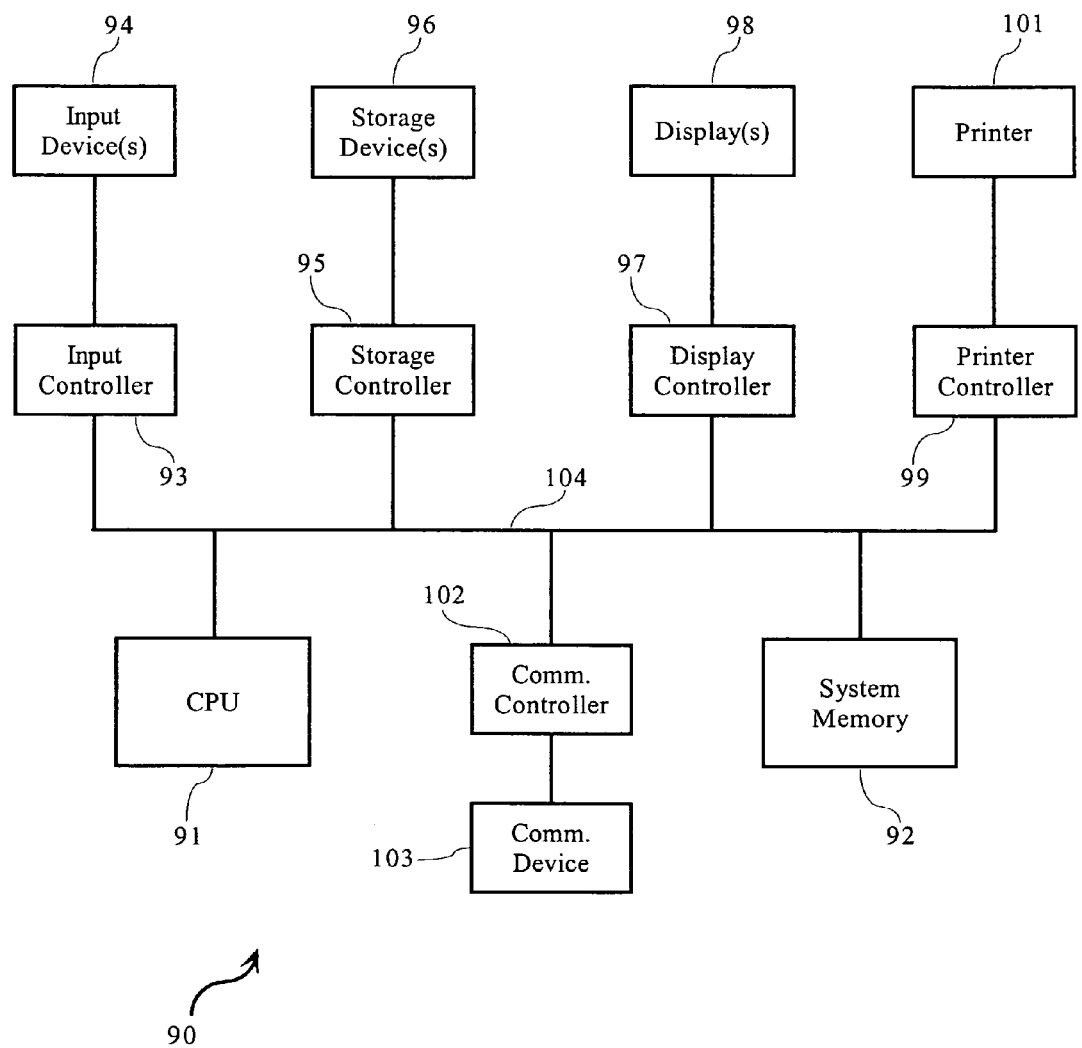
FIG. 9 is a block diagram illustrating an exemplary system that may be used to implement aspects of the present invention.

Having described the details of the invention, an exemplary system 90 which may be used to implement one or more aspects of the present invention will now be described with reference to FIG. 9. As illustrated in FIG. 9, the system, which may be an XP Windows workstation, includes a central processing unit (CPU) 91 that provides computing resources and controls the computer. CPU 91 may be implemented with a microprocessor or the like, and may represent more than one CPU (e.g., dual Xeon 2.8 GHz CPUs), and may also include one or more auxiliary chips such as a graphics processor. System 90 further includes system memory 92, which may be in the form of random-access memory (RAM) and read-only memory (ROM).

A number of controllers and peripheral devices are also provided, as shown in FIG. 9. Input controller 93 represents an interface to various input devices 94, such as a keyboard, mouse or stylus. A storage controller 95 interfaces with one or more storage devices 96 each of which includes a storage medium such as magnetic tape or disk, or an optical medium that may be used to record programs of instructions for operating systems, utilities and applications which may include embodiments of programs that implement various aspects of the present invention. Storage device(s) 96 may also be used to store processed or data to be processed in accordance with the invention. A display controller 97 provides an interface to a display device 98, which may be any know type, for viewing the simulation. A printer controller 99 is also provided for communicating with a printer 101. A communications controller 102 interfaces with one or more communication devices 103 that enables system 90 to connect to remote devices through any of a variety of networks including the Internet, a local area network (LAN), a wide area network (WAN), or through any suitable electromagnetic carrier signals including infrared signals.

In the illustrated system, all major system components connect to bus 104 which may represent more than one physical bus. However, various system components may or may not be in physical proximity to one another. For example, input data and/or output data may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape, disk, optical disc, or network signals.

The present invention may be conveniently implemented with software. However, alternative implementations are certainly possible, including a hardware and/or a software/hardware implementation. Hardware-implemented functions may be realized using ASIC(s), digital signal processing circuitry, or the like. Accordingly, the phrase "components or modules" in the claims is intended to cover both software and hardware implementations. Similarly, the term "machine-readable medium" as used herein includes software, hardware having a program of instructions hard-wired thereon, or combination thereof. With these implementation alternatives in mind, it is to be understood that the figures and accompanying description provide the functional information one skilled in the art would require to write program code (i.e., software) or to fabricate circuits (i.e., hardware) to perform the processing required.

While the invention has been described in conjunction with several specific embodiments, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

$$\text{Appendix} \tag{1}$$
$$\nabla \cdot u = 0,$$

$$\rho(\phi)\frac{Du}{Dt} = -\nabla p + \nabla \cdot (2\mu(\phi)D) - \sigma\kappa(\phi)\delta(\phi)\nabla\phi. \tag{2}$$

$$D = \frac{1}{2}[\nabla u + (\nabla u)^T], \tag{3}$$
$$u = ue_1 + ve_2,$$

$$\phi(x, y, t) \begin{cases} < 0 & \text{if } (x, y) \in \text{fluid \#2(air)} \\ = 0 & \text{if } (x, y) \in \text{interface} \\ > 0 & \text{if } (x, y) \in \text{fluid \#1(ink)} \end{cases} \tag{4}$$

$$n = \frac{\nabla\phi}{|\nabla\phi|}\bigg|_{\phi=0}, \tag{5}$$

$$\kappa = \nabla \cdot \left(\frac{\nabla\phi}{|\nabla\phi|}\right)\bigg|_{\phi=0}.$$

$$x = Lx', \quad y = Ly', \quad u = Uu', \quad t = \frac{L}{U}t', \tag{6}$$
$$p = \rho_1 U^2 p', \quad \rho = \rho_1 \rho', \quad \mu = \mu_1 \mu',$$

$$\nabla \cdot u = 0, \tag{7}$$

$$\frac{\partial u}{\partial t} + (u \cdot \nabla)u = \tag{8}$$
$$-\frac{1}{\rho(\phi)}\nabla p + \frac{1}{\rho(\phi)Re}\nabla \cdot (2\mu(\phi)D) - \frac{1}{\rho(\phi)We}\kappa(\phi)\delta(\phi)\nabla\phi,$$

$$\rho(\phi) = \begin{cases} 1 & \text{if } \phi \geq 0 \\ \rho_2/\rho_1 & \text{if } \phi < 0 \end{cases}, \tag{9}$$

$$\mu(\phi) = \begin{cases} 1 & \text{if } \phi \geq 0 \\ \mu_2/\mu_1 & \text{if } \phi < 0 \end{cases},$$

$$Re = \frac{\rho_1 UL}{\mu_1},$$

$$We = \frac{\rho_1 U^2 L}{\sigma}.$$

$$\frac{\partial\phi}{\partial t} + u \cdot \nabla\phi = 0. \tag{10}$$

$$\frac{\partial u}{\partial t} + \nabla \cdot (uu) = \tag{11}$$
$$-\frac{1}{\rho(\phi)}\nabla p + \frac{1}{\rho(\phi)Re}\nabla \cdot (2\mu(\phi)D) - \frac{1}{\rho(\phi)We}\kappa(\phi)\delta(\phi)\nabla\phi,$$

$$\frac{\partial\phi}{\partial t} + \nabla \cdot (u\phi) = 0. \tag{12}$$

$$\nabla \cdot (u\phi) = \frac{\partial(u\phi)}{\partial x} + \frac{\partial(v\phi)}{\partial y} \tag{13}$$
$$= \frac{\partial(u\phi)}{\partial x} + \frac{\partial(v\phi)}{\partial y}$$
$$= \phi(u_x + v_y) + u\phi_x + v\phi_y$$
$$= \phi\nabla \cdot u + (u \cdot \nabla)\phi$$
$$= (u \cdot \nabla)u.$$

$$u = u^{BC} \tag{14}$$

$$p = p^{BC}, \frac{\partial u}{\partial n} = 0, \tag{15}$$

$$u^n = u(t = t^n) \tag{16}$$

$$H(\phi) = \begin{cases} 0 & \text{if } \phi < -\in \\ \frac{1}{2}\left[1 + \frac{\phi}{\in} + \frac{1}{\pi}\sin(\pi\phi/\in)\right] & \text{if } |\phi| \leq \in \\ 1 & \text{if } \phi > \in. \end{cases} \tag{17}$$

$$\delta(\phi) = \frac{dH(\phi)}{d\phi}. \tag{18}$$

$$\in = \alpha\Delta x, \tag{19}$$

$$\rho(\phi) = \frac{\rho_2}{\rho_1} + H(\phi)\left(1 - \frac{\rho_2}{\rho_1}\right), \tag{20}$$
$$\mu(\phi) = \frac{\mu_2}{\mu_1} + H(\phi)\left(1 - \frac{\mu_2}{\mu_1}\right).$$

$$u^n(x, y) = u^n_{i,j} + \frac{u^t_{i,j}}{\Delta x}(x - x_i) + \frac{u^t_{i,j}}{\Delta y}(y - y_j), \tag{21}$$
$$\phi^n(x, y) = \phi^n_{i,j} + \frac{\phi^t_{i,j}}{\Delta x}(x - x_i) + \frac{\phi^t_{i,j}}{\Delta y}(y - y_j).$$

-continued $$\frac{u'_{i,j}}{\Delta x} = \frac{u^n_{i+1,j} - u^n_{i-1,j}}{2\Delta x}, \quad \frac{u^t_{i,j}}{\Delta y} = \frac{u^n_{i,j+1} - u^n_{i,j-1}}{2\Delta y},$$

$$\frac{\phi'_{i,j}}{\Delta x} = \frac{\phi^n_{i+1,j} - \phi^n_{i-1,j}}{2\Delta x}, \quad \frac{\phi^t_{i,j}}{\Delta y} = \frac{\phi^n_{i,j+1} - \phi^n_{i,j-1}}{2\Delta y}. \tag{22}$$

$$u^{n+1/2}_{i,j} = u^n_{i,j} + \frac{\Delta t}{2} \frac{\partial u}{\partial t}\bigg|_{t=t^n},$$

$$\phi^{n+1/2}_{i,j} = \phi^n_{i,j} + \frac{\Delta t}{2} \frac{\partial \phi}{\partial t}\bigg|_{t=t^n}. \tag{23}$$

$$u^{n+1/2}_{i,j} = u^n_{i,j} + \frac{\Delta t}{2}\Bigg\{-\frac{\partial p^n_{i,j}}{\partial x} - \left(2\frac{u'_{i,j}}{\Delta x}u^n_{i,j} + \frac{u^t_{i,j}}{\Delta y}v^n_{i,j} + \frac{v^t_{i,j}}{\Delta y}u^n_{i,j}\right) +$$

$$\frac{1}{\rho(\phi^n)Re}\left[(2\mu(\phi)u_{,x})_{,x} + (\mu(\phi)(u_{,y} + v_{,x}))_{,y}\right]_{t=t^n} -$$

$$\frac{1}{\rho(\phi^n)We}\kappa(\phi^n)\delta(\phi^n)\phi^n_{,x}\Bigg\},$$

$$v^{n+1/2}_{i,j} = v^n_{i,j} + \frac{\Delta t}{2}\Bigg\{-\frac{\partial p^n_{i,j}}{\partial y} - \left(\frac{u'_{i,j}}{\Delta x}v^n_{i,j} + \frac{v'_{i,j}}{\Delta x}u^n_{i,j} + 2\frac{v^t_{i,j}}{\Delta y}v^n_{i,j}\right) +$$

$$\frac{1}{\rho(\phi^n)Re}\left[(\mu(\phi)(u_{,y} + v_{,x}))_{,x} + (2\mu(\phi)v_{,y})_{,y}\right]_{t=t^n} -$$

$$\frac{1}{\rho(\phi^n)We}\kappa(\phi^n)\delta(\phi^n)\phi^n_{,y}\Bigg\}, \tag{24}$$

$$\phi^{n+1/2}_{i,j} = \phi^n_{i,j} - \frac{\Delta t}{2}\left\{\frac{1}{\Delta x}(u'_{i,j}\phi^n_{i,j} + u^n_{i,j}\phi'_{i,j}) + \frac{1}{\Delta y}(v^t_{i,j}\phi^n_{i,j} + v^n_{i,j}\phi^t_{i,j})\right\}.$$

$$\tilde{\phi}^{n+1}_{i+1/2,j+1/2} = \frac{1}{\Delta x \Delta y}\int_{C_{i+1/2,j+1/2}} \phi(x, y, t^{n+1})\,dxdy, \tag{25}$$

$$\tilde{u}^{n+1}_{i+1/2,j+1/2} = \frac{1}{\Delta x \Delta y}\int_{C_{i+1/2,j+1/2}} u(x, y, t^{n+1})\,dxdy.$$

$$\phi = \phi^n - \int \nabla \cdot (u\phi)\,dt \tag{26}$$

$$\tilde{\phi}^{n+1}_{i+1/2,j+1/2} = \frac{1}{\Delta x \Delta y}\int_{C_{i+1/2,j+1/2}} \phi(x, y, t^n)\,dxdy - \tag{27}$$

$$\frac{1}{\Delta y}D^+_x \int_{\tau=t^n}^{t^{n+1}} \int_{y \in J_{i+1/2}} (u\phi)\,dyd\tau -$$

$$\frac{1}{\Delta x}D^+_y \int_{\tau=t^n}^{t^{n+1}} \int_{x \in I_{i+1/2}} (v\phi)\,dxd\tau.$$

$$\frac{1}{\Delta y}D^+_x \int_{\tau=t^n}^{t^{n+1}} \int_{y \in J_{i+1/2}} (u\phi)\,dyd\tau = \Delta t[D^+_x \mu^+_y (u^{n+1/2}_{i,j}\phi^{n+1/2}_{i,j})], \tag{28}$$

$$D^+_x u_{i,j} = \frac{u_{i+1,j} - u_{i-1,j}}{2\Delta x}, \quad \mu^+_y u_{i,j} = \frac{u_{i,j+1} + u_{i,j-1}}{2}. \tag{29}$$

$$\tilde{\phi}^{n+1}_{i+1/2,j+1/2} = \mu^+_x \mu^+_y \phi^n_{i,j} - \frac{\Delta x}{8}D^+_x \mu^+_y \phi'_{i,j} - \frac{\Delta y}{8}D^+_y \mu^+_x \phi^t_{i,j} - \tag{30}$$

$$\Delta t[D^+_x \mu^+_y (u^{n+1/2}_{i,j}\phi^{n+1/2}_{i,j}) + D^+_y \mu^+_x (v^{n+1/2}_{i,j}\phi^{n+1/2}_{i,j})].$$

$$\tilde{u}^{n+1}_{i+1/2,j+1/2} = \frac{1}{\Delta x \Delta y}\int_{C_{i+1/2,j+1/2}} u(x, y, t^n)\,dxdy - \tag{31}$$

$$\frac{1}{\Delta y}D^+_x \int_{\tau=t^n}^{t^{n+1}} \int_{y \in J_{i+1/2}} u^2\,dyd\tau - \frac{1}{\Delta x}D^+_y$$

$$\int_{\tau=t^n}^{t^{n+1}} \int_{x \in I_{i+1/2}} vu\,dxd\tau + \frac{1}{\Delta x \Delta y}\int_{\tau=t^n}^{t^{n+1}} \int_{C_{i+1/2,j+1/2}} \frac{1}{\rho(\phi)Re}$$

$$\{(2\mu(\phi)u_{,x})_{,x} + [\mu(\phi)(u_{,y} + v_{,x})]_{,y}\}\,dxdyd\tau -$$

$$\frac{1}{\Delta x \Delta y}\int_{\tau=t^n}^{t^{n+1}} \int_{C_{i+1/2,j+1/2}} \frac{1}{\rho(\phi)We}\kappa(\phi)\delta(\phi)\phi_{,x}\,dxdyd\tau =$$

$$\mu^+_x \mu^+_y u^n_{i,j} - \frac{\Delta x}{8}D^+_x \mu^+_y u'_{i,j} - \frac{\Delta y}{8}D^+_y \mu^+_x u^t_{i,j} -$$

$$\Delta t[D^+_x \mu^+_y (u^{n+1/2}_{i,j} u^{n+1/2}_{i,j}) + D^+_y \mu^+_x (v^{n+1/2}_{i,j} u^{n+1/2}_{i,j})] +$$

$$\Delta t \frac{\mu^+_x \mu^+_y}{\rho(\phi^{n+1/2})Re}\{(2\mu(\phi)u_{,x})_{,x} + [\mu(\phi)(u_{,y} + v_{,x})]_{,y}\}^{n+1/2}_{i,j} -$$

$$\Delta t \mu^+_x \mu^+_y \left\{\frac{1}{\rho(\phi)We}\kappa(\phi)\delta(\phi)\phi_{,x}\right\}^{n+1/2}_{i,j},$$

and $$\tilde{v}^{n+1}_{i+1/2,j+1/2} = \frac{1}{\Delta x \Delta y}\int_{C_{i+1/2,j+1/2}} v(x, y, t^n)\,dxdy - \tag{32}$$

$$\frac{1}{\Delta y}D^+_x \int_{\tau=t^n}^{t^{n+1}} \int_{y \in J_{i+1/2}} uv\,dyd\tau - \frac{1}{\Delta x}D^+_y$$

$$\int_{\tau=t^n}^{t^{n+1}} \int_{x \in I_{i+1/2}} v^2\,dxd\tau + \frac{1}{\Delta x \Delta y}\int_{\tau=t^n}^{t^{n+1}} \int_{C_{i+1/2,j+1/2}} \frac{1}{\rho(\phi)Re}$$

$$\{[\mu(\phi)(u_{,y} + v_{,x})]_{,x} + (2\mu(\phi)v_{,y})_{,y}\}\,dxdyd\tau -$$

$$\frac{1}{\Delta x \Delta y}\int_{\tau=t^n}^{t^{n+1}} \int_{C_{i+1/2,j+1/2}} \frac{1}{\rho(\phi)We}\kappa(\phi)\delta(\phi)\phi_{,y}\,dxdyd\tau =$$

$$\mu^+_x \mu^+_y v^n_{i,j} - \frac{\Delta x}{8}D^+_x \mu^+_y v'_{i,j} - \frac{\Delta y}{8}D^+_x \mu^+_x v^t_{i,j} -$$

$$\Delta t[D^+_x \mu^+_y (u^{n+1/2}_{i,j} v^{n+1/2}_{i,j}) + D^+_y \mu^+_x (v^{n+1/2}_{i,j} v^{n+1/2}_{i,j})] +$$

$$\Delta t \frac{\mu^+_x \mu^+_y}{\rho(\phi^{n+1/2})Re}\{[\mu(\phi)(u_{,y} + v_{,x})]_{,x} + (2\mu(\phi)v_{,y})_{,y}\}^{n+1/2}_{i,j} -$$

$$\Delta t \mu^+_x \mu^+_y \left\{\frac{1}{\rho(\phi)We}\kappa(\phi)\delta(\phi)\phi_{,y}\right\}^{n+1/2}_{i,j}.$$

$$u^{n+1} = \tilde{u}^{n+1} - \frac{1}{\rho^{n+1/2}}\nabla p^{n+1} \tag{33}$$

$$\nabla \cdot \left(\frac{\Delta t}{\rho(\phi^{n+1/2})}\nabla p^{n+1}\right) = \nabla \cdot \tilde{u}^{n+1}. \tag{34}$$

$$\int_\Omega u^* \cdot \nabla \psi\,dx = \int_\Omega \frac{\Delta t}{\rho(\phi^{n+1/2})}\nabla p^{n+1} \cdot \nabla \psi\,dx + \int_{\Gamma_1} \psi u^{BC} \cdot n\,dS, \tag{35}$$

$$\frac{\Delta t}{\rho(\phi^{n+1/2})}\frac{\partial p^{n+1}}{\partial n} = (u^* - u^{BC}) \cdot n. \tag{36}$$

$$\phi_{t'} + F|\phi| = 0, \tag{37}$$

$$\Delta t < \min_{i,j}\left[\frac{\Delta x}{u}, \frac{\Delta y}{v}, \sqrt{We\frac{\rho_1 + \rho_2}{8\pi}}\,h^{3/2},\right. \tag{38}$$

$$\left.\frac{Re}{2}\frac{\rho^n}{\mu^n}\left(\frac{1}{\Delta x^2} + \frac{1}{\Delta y^2}\right)^{-1}, \sqrt{\frac{2h}{|F^n|}}\,\right],$$

-continued $$\frac{\Delta t}{\Delta x^2}\left[\frac{1}{\rho_{i+1/2,j}^{n+1/2}}(p_{i+1,j}^{n+1}-p_{i,j}^{n+1})-\frac{1}{\rho_{i-1/2,j}^{n+1/2}}(p_{i,j}^{n+1}-p_{i-1,j}^{n+1})\right]+ \quad (39)$$

$$\frac{\Delta t}{\Delta y^2}\left[\frac{1}{\rho_{i,j+1/2}^{n+1/2}}(p_{i,j+1}^{n+1}-p_{i,j}^{n+1})-\frac{1}{\rho_{i,j-1/2}^{n+1/2}}(p_{i,j}^{n+1}-p_{i,j-1}^{n+1})\right]=$$

$$\frac{1}{2\Delta x}(\tilde{u}_{i+1/2,j+1/2}^{n+1}+\tilde{u}_{i+1/2,j-1/2}^{n+1}-\tilde{u}_{i-1/2,j+1/2}^{n+1}-\tilde{u}_{i-1/2,j-1/2}^{n+1})+$$

$$\frac{1}{2\Delta y}(\tilde{u}_{i+1/2,j+1/2}^{n+1}+\tilde{u}_{i-1/2,j+1/2}^{n+1}-\tilde{u}_{i+1/2,j-1/2}^{n+1}-\tilde{u}_{i-1/2,j-1/2}^{n+1}).$$

$$\rho_{i+1/2,j}^{n+1/2}=\frac{\rho_{i,j}^{n+1/2}+\rho_{i+1,j}^{n+1/2}}{2}. \quad (40)$$

$$p_{i+1,j}^{n+1}=p_{i,j}^{n+1}. \quad (41)$$

$$p_{i,0}=2p^{BC}-p_{i,1}. \quad (42)$$

$$\int_\Omega \frac{\Delta t}{\rho^{n+2}}\nabla p^{n+2}\cdot\nabla\psi dx = \int_\Omega \tilde{u}^{n+2}\cdot\nabla\psi dx - \int_{\Gamma_1}\psi u^{BC}\cdot n dS. \quad (43)$$

$$\frac{\int_\Omega \frac{\Delta t}{\rho^{n+2}}\nabla p^{n+2}\cdot\nabla\psi_{i+1/2,j+1/2} dx}{\int_\Omega \psi_{i+1/2,j+1/2} dx}= \quad (44)$$

$$\frac{\int_\Omega \tilde{u}^{n+2}\cdot\nabla\psi_{i+1/2,j+1/2}dx}{\int_\Omega \psi_{i+1/2,j+1/2}dx}-\frac{\int_{\Gamma_1}\psi_{i+1/2,j+1/2}u^{BC}\cdot ndS}{\int_\Omega \psi_{i+1/2,j+1/2}dx}.$$

$$\frac{\Delta t}{6\rho_{i,j}^{n+2}}\left[\left(\frac{2}{\Delta x^2}+\frac{2}{\Delta y^2}\right)p_{i+1/2,j+1/2}^{n+2}-\left(\frac{2}{\Delta x^2}-\frac{1}{\Delta y^2}\right)p_{i-1/2,j+1/2}^{n+2}+\right. \quad (45)$$

$$\left.\left(\frac{1}{\Delta x^2}-\frac{2}{\Delta y^2}\right)p_{i+1/2,j-1/2}^{n+2}-\left(\frac{1}{\Delta x^2}+\frac{1}{\Delta y^2}\right)p_{i-1/2,j-1/2}^{n+2}\right]+$$

$$\frac{\Delta t}{6\rho_{i+1,j}^{n+2}}\left[\left(\frac{2}{\Delta x^2}+\frac{2}{\Delta y^2}\right)p_{i+1/2,j+1/2}^{n+2}+\left(\frac{1}{\Delta x^2}-\frac{2}{\Delta y^2}\right)p_{i+1/2,j-1/2}^{n+2}-\right.$$

$$\left.\left(\frac{2}{\Delta x^2}-\frac{1}{\Delta y^2}\right)p_{i+3/2,j+1/2}^{n+2}-\left(\frac{1}{\Delta x^2}+\frac{1}{\Delta y^2}\right)p_{i+3/2,j-1/2}^{n+2}\right]+$$

$$\frac{\Delta t}{6\rho_{i,j+1}^{n+1}}\left[\left(\frac{2}{\Delta x^2}+\frac{2}{\Delta y^2}\right)p_{i+1/2,j+1/2}^{n+2}+\left(\frac{1}{\Delta x^2}+\frac{1}{\Delta y^2}\right)p_{i+1/2,j+3/2}^{n+2}-\right.$$

$$\left.\left(\frac{2}{\Delta x^2}-\frac{1}{\Delta y^2}\right)p_{i-1/2,j+1/2}^{n+2}-\left(\frac{1}{\Delta x^2}+\frac{1}{\Delta y^2}\right)p_{i-1/2,j+3/2}^{n+2}\right]+$$

$$\frac{\Delta t}{6\rho_{i+1,j+1}^{n+2}}\left[\left(\frac{2}{\Delta x^2}+\frac{2}{\Delta y^2}\right)p_{i+1/2,j+1/2}^{n+2}+\left(\frac{1}{\Delta x^2}-\frac{2}{\Delta y^2}\right)p_{i+1/2,j+3/2}^{n+2}-\right.$$

$$\left.\left(\frac{2}{\Delta x^2}-\frac{1}{\Delta y^2}\right)p_{i+3/2,j+1/2}^{n+2}-\left(\frac{1}{\Delta x^2}+\frac{1}{\Delta y^2}\right)p_{i+3/2,j+3/2}^{n+2}\right]$$

$$\frac{1}{2\Delta x}(\tilde{u}_{i,j+1}^{n+2}+\tilde{u}_{i,j}^{n+2}-\tilde{u}_{i+1,j+1}^{n+2}-\tilde{u}_{i+1,j}^{n+2})+ \quad (46)$$

$$\frac{1}{2\Delta y}(\tilde{v}_{i+1,j}^{n+2}+\tilde{v}_{i,j}^{n+2}-\tilde{v}_{i+1,j+1}^{n+2}-\tilde{v}_{i,j+1}^{n+2})$$

What is claimed is:

1. A method for simulating and analyzing fluid ejection from a channel, there being a boundary between a first fluid that flows through the channel and a second fluid, the method comprising the steps of:
   (a) formulating a central-difference-based discretization on a uniform rectangular grid, wherein the rectangular grid comprises a plurality of cells;
   (b) performing finite difference analysis on the uniform rectangular grid using the central-difference-based discretization to solve equations governing the flow of the first fluid through the channel, wherein:
      (i) for a plurality of cells there is a velocity vector of the first fluid at a first point in time;
      (ii) a plurality of level set values for characterizing the boundary between the first fluid and the second fluid;
      (iii) the central-difference-based discretization is used to calculate the velocity of the first fluid for each cell at a second point in time;
      (iv) for each cell in which there is a corresponding velocity vector the velocity vector is located at an approximate center of that cell at one time point and at a grid point of the cell at a next time point; and
      (v) for each cell in which there is a corresponding level set value the level set value is located at an approximate center of the cell at one time point and at a grid point of the cell at a next time point; and
   (c) simulating the flow of the first fluid through, and ejection from, the channel based on the performed finite difference analysis.

2. The method of claim 1, wherein the first fluid is ink, the second fluid is air, and the channel comprises an ink-jet nozzle that is part of a piezoelectric ink-jet head.

3. A computer-readable medium encoded with a computer program which a computer to perform the method recited in claim 1.

4. A computer including the computer-readable medium recited in claim 3.

5. The method of claim 1, wherein step (a) includes constructing multi-grid compatible projection operators, including a finite difference projection operator and a finite element projection operator.

6. The method of claim 5, wherein, in step (b), finite difference analysis is performed on the uniform rectangular grid using the central-difference-based discretization to solve equations governing the flow of at least the first fluid through the channel in each cell at each time point, the finite difference projection operator being applied after step (b) is performed with the velocity vectors and level set values being located at the grid points and the finite element projection operator being applied after step (b) is performed with velocity vectors and level set values being located at the approximate cell centers.

* * * * *

UNITED STATES PATENT AND TRADEMARK OFFICE
CERTIFICATE OF CORRECTION

PATENT NO. : 7,349,833 B2  Page 1 of 1
APPLICATION NO. : 10/957349
DATED : March 25, 2008
INVENTOR(S) : Jiun-Der Yu It is certified that error appears in the above-identified patent and that said Letters Patent is hereby corrected as shown below:

<u>Column 18</u>

Claim 3, line 35, after "which" insert --configures--

Claim 4, line 37, delete "A" insert --The--

Signed and Sealed this

Fourth Day of November, 2008

JON W. DUDAS
*Director of the United States Patent and Trademark Office*